(12) United States Patent
Hoch et al.

(10) Patent No.: US 7,386,375 B2
(45) Date of Patent: Jun. 10, 2008

(54) GASOLINE FUEL CELL POWER SYSTEM TRANSIENT CONTROL

(75) Inventors: Martin M Hoch, Webster, NY (US); Julie A Stuart, Farmington, NY (US)

(73) Assignee: General Motors Corporation, Detroit, MI (US)

( * ) Notice: Subject to any disclaimer, the term of this patent is extended or adjusted under 35 U.S.C. 154(b) by 695 days.

(21) Appl. No.: 10/935,452

(22) Filed: Sep. 7, 2004

(65) Prior Publication Data
US 2006/0052916 A1    Mar. 9, 2006

(51) Int. Cl.
*G06F 17/00* (2006.01)
*B60L 9/00* (2006.01)
(52) U.S. Cl. .......................................... 701/22; 180/2.2
(58) Field of Classification Search ................ 701/22; 422/198–199; 429/12; 205/343; 320/101; 180/2.2
See application file for complete search history.

(56) References Cited

U.S. PATENT DOCUMENTS

| | | | | |
|---|---|---|---|---|
| 5,827,496 A | * | 10/1998 | Lyon | 423/659 |
| 6,878,362 B2 | * | 4/2005 | Kumar et al. | 423/651 |
| 7,008,716 B2 | * | 3/2006 | England | 429/35 |
| 2005/0196653 A1 | * | 9/2005 | Haltiner et al. | 429/19 |

* cited by examiner

Primary Examiner—Yonel Beaulieu

(57) ABSTRACT

A reformer fuel feed stream in fuel cell power system is catalytically reacted into a reformate stream for a fuel cell stack by adjusting fuel supply throughput according to a predefined throughput ramp when a time derivative and the current demand for the fuel cell deviates from zero by more than an acceleration threshold value. The fuel cell power system is of special value when deployed on a vehicle where the load command is derived from the accelerator pedal of the vehicle.

24 Claims, 7 Drawing Sheets

GASOLINE FUEL CELL POWER SYSTEM TRANSIENT CONTROL

FIELD OF THE INVENTION

The present invention relates to fuel cell power system operation, especially to load transient operation of a fuel cell power system having a reformer that converts hydrocarbon to a hydrogen-containing feed for a fuel cell stack.

BACKGROUND OF THE INVENTION

Fuel cell power systems convert a fuel and an oxidant to electricity. One fuel cell power system type of keen interest employs use of a proton exchange membrane (hereinafter "PEM") to catalytically facilitate reaction of fuels (such as hydrogen) and oxidants (such as air/oxygen) into electricity. The PEM is a solid polymer electrolyte that facilitates transfer of protons from the anode to the cathode in each individual fuel cell of the stack of fuel cells normally deployed in a fuel cell power system.

As fuel cell power systems are deployed into application having transient power demands such as motor vehicles, fuel cell power system response becomes an issue of concern. In this regard, some components in many fuel cell power systems are designed for operation in a relatively steady state dynamic context where load transients are best accommodated over a relatively long period of time. Vehicles, however, require fairly rapid load change response by the fuel cell power system. In addition to prompt response for the vehicle, the power system ideally maintains nominal voltage output levels during load transients and also effectively handles thermal and/or stoichiometric transients such as carbon monoxide spikes and hydrogen starvation that accompany the load transients.

When a fuel cell power system processes a hydrocarbon by steam reformation and/or partial oxidation to feed high hydrogen content reformate to a fuel cell stack, responsiveness and long-term robustness are needed in both the fuel cell stack and in the reforming process. One problem in this regard occurs when a dramatic upward demand transient on a fuel cell depresses stack output voltage as insufficient hydrogen flows to the fuel cell stack to sustain the voltage during the transient. This condition occurs if the hydrocarbon reforming rate does not accelerate to essentially match acceleration in demand. Another problem is that unacceptably low cell output voltage during the load transient can result from carbon monoxide "spikes" in reformate gas if water vaporization rate change lags the acceleration in load. Reactor durability is also adversely affected as the fuel vaporization rate change lags the acceleration in load and commensurate temperature "spikes" damage the reforming catalyst.

While one solution to the above problems is to delay the response of the vehicle to a change in load command so that essentially steady-state conditions are sustained in the power system, such a solution is unacceptable for drivers conditioned to expect the responsiveness provided by an internal combustion engine. Such a solution is also potentially dangerous for a vehicle operating in a transportation infrastructure built for immediate responsiveness.

What is needed is a fuel cell power system that responds smoothly and comprehensively to load transients. The present invention provides a solution to this need.

SUMMARY OF THE INVENTION

The invention provides for catalytically reacting at least one reformer feed stream into a fuel supply stream for a fuel cell by adjusting throughput of each feed stream according to a predefined throughput ramp when the rate of change in a load command measurement for the fuel cell deviates from zero by more than a threshold value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
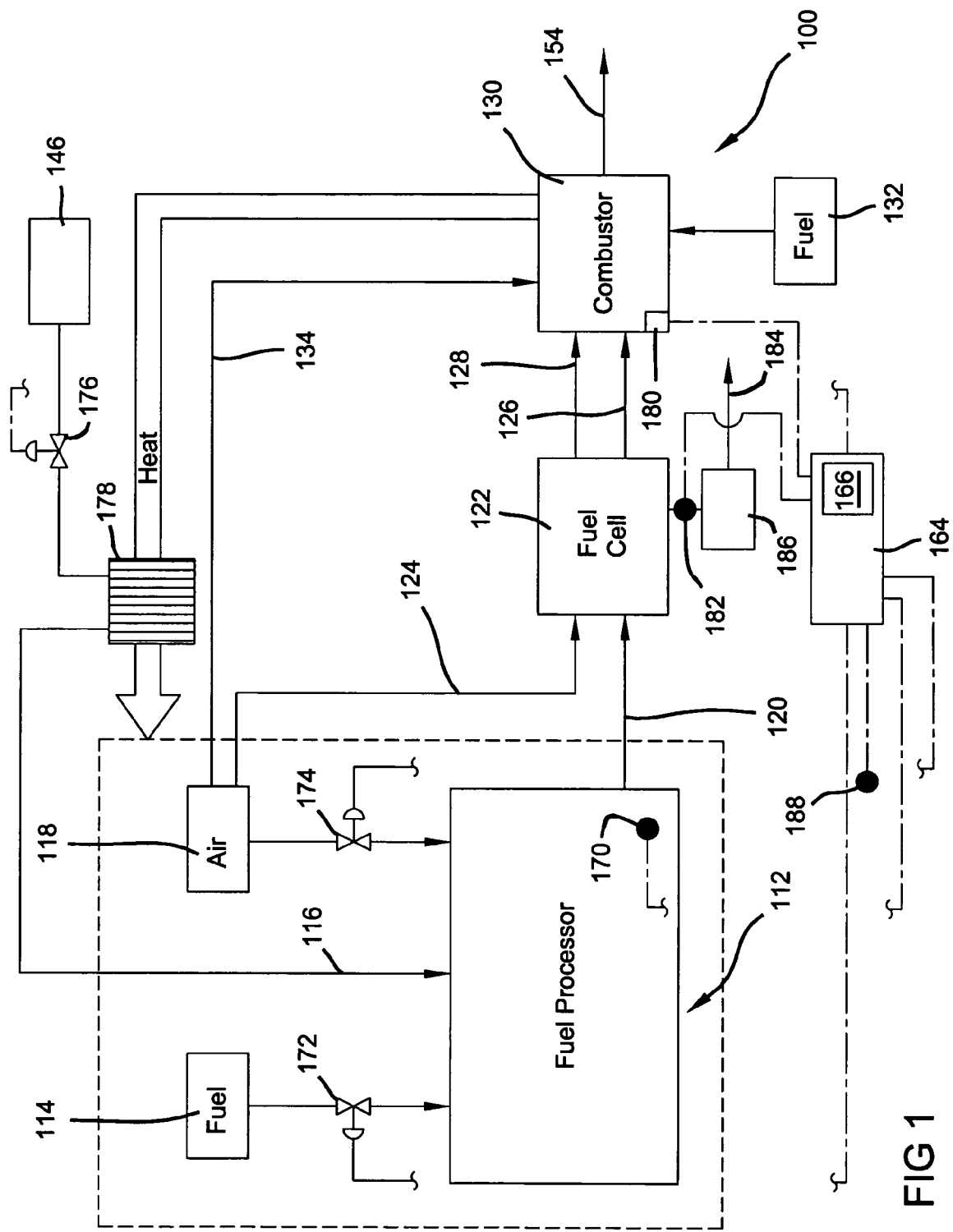
FIG. 1 shows a block flow diagram for a fuel cell power system having a fuel processor for catalytically reacting a reformable hydrocarbon fuel to a feed stream for a fuel cell stack.

The following description of the preferred embodiment is merely exemplary in nature and is in no way intended to limit the invention, its application, or uses.

In overview, the preferred embodiment of the present invention uses a feed forward control approach to minimize the effect of water and fuel vaporizer lag once a load transient has been initiated. More specifically, the rate of change in the load command (the time derivative of the current demand) triggers a pre-determined step change adjustment to begin a pre-determined adjustment of fuel and water flows to the primary reactor of the reformer (e.g. an auto-thermal reactor also designated as the ATR). In this regard, the anode stoichiometry is promptly modified according to a predefined throughput step when a sudden change in the load command is detected. The step changes in feed settings adjust the steam to carbon (S/C) ratio and oxygen to carbon (O/C) ratio in conjunction with the general adjustments to the feed settings of the power system. In other words, the present invention provides means for varying the operational state of the fuel processor system to account for large deviations from a steady-state or quasi-steady-state operation of the system.

In a fuel reformer based fuel cell system (where a fuel such as gasoline or methanol is reformed to a hydrogen-containing feed stream for the fuel cell stack), liquid fuel and water flowing to the fuel reforming system must be vaporized prior to entry into the primary reactor (ATR). When increased electrical output is required from the fuel cell stack, commensurately greater fuel and water must be vaporized in order to provide the increased electrical output. During an up-transient, when the electrical demand increases rapidly, a time lag affects achieving the necessary higher flow rates of fuel and water vapor. Even if fuel and water are delivered to the power system with appropriate increase in mass flow, sizing of the vaporizers within the system usually establishes the basis for lag to the system as a whole. Undesirable instantaneous O/C ratio increase and S/C ratio decrease occur since there is relatively little time lag respective to air flow into the ATR during an up-transient. Unacceptable stack output voltage decline (as a result of insufficient hydrogen flow and carbon monoxide "spikes" in the reformate gas) and reactor catalyst degradation (from temperature "spikes") occur as the O/C and S/C ratio metrics within the ATR deviate, during load command transients, from mismatches in the time constants of their associated feeds.

The carbon monoxide problem is mitigated in the present invention by water enrichment whereby extra water and energy is delivered into the water vaporizer (increasing the S/C ratio) at the beginning of the up-transient. The water enrichment triggers when the time derivative of requested load (i.e. current demand) exceeds a threshold value. The higher S/C ratio continues to be delivered throughout the ramp-up in load command, until the rate of change in desired load falls below an appropriate threshold trigger value. When the desired load shifts below the threshold, the S/C ratio transitions back to the steady state operations value.

The O/C ratio controls operating temperature in the ATR. An increase in the O/C ratio commensurately increases ATR temperature and, conversely, a decrease in the O/C ratio decreases ATR temperature. The temperature at the inlet of the ATR is normally used as feedback to determine how to change the O/C ratio to obtain the desired operating temperature (approximately 750 degrees C.). This control approach works well in steady-state operation, but responds too slowly in up-transients, resulting in the aforementioned temperature spike. This problem is mitigated in the present invention by issuing an O/C correction based on the time derivative of the current demand. Based on the magnitude of the derivative, the O/C ratio is immediately decreased by a calibrated amount at the start of an up-transient. After this initial correction, the O/C ratio is continuously adjusted based on real time feedback of ATR temperature. Conversely, an ATR temperature decline can be avoided by increasing the O/C ratio by a calibrated amount at the start of a downward transient.

The present invention is further understood with reference to a generic fuel cell power system. Therefore, before further describing the invention, a general overview of the fuel cell power system of the invention is provided. In the system, a hydrocarbon fuel is processed in a fuel processor, for example, by reformation and partial oxidation processes, to produce a reformate gas which has a relatively high hydrogen content on a volume or molar basis. Therefore, reference is made to hydrogen-containing as having relatively high hydrogen content. The present invention is hereafter described in the context of a fuel cell fueled by an $H_2$-containing reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkaline, or other aliphatic or aromatic hydrocarbons.

As shown in FIG. 1, fuel cell power system 100 includes a fuel processor 112 for catalytically reacting a reformable hydrocarbon fuel stream 114, and water stream 116 in the form of steam from a water vaporizer 178 and water reservoir 146. Fuel stream 114 is regulated by control valve 172 and water stream 116 is regulated by control valve 176. In some fuel processors, air is also used in a combination partial oxidation/steam reforming reaction. In this case, fuel processor 112 also receives an air stream 118. Air stream 118 is regulated by control valve 174. Fuel processor 112 contains one or more reactors wherein reformable hydrocarbon fuel in stream 114 undergoes dissociation in the presence of steam in stream 116 and air in stream 118 to produce hydrogen-containing reformate exhausted from fuel processor 112 in reformate stream 120. Fuel processor 112 typically also includes one or more downstream reactors, such as water-gas shift (WGS) and/or preferential oxidizer (PrOx) reactors for reducing the level of carbon monoxide in reformate stream 120 to acceptable levels, for example, below 20 ppm. $H_2$-containing reformate 120 is fed to the anode chamber of fuel cell stack system 122. As should also be apparent, an oxidant having greater than about 25 weight percent oxygen is, in some embodiments, fed or provided in stream 124 in the place of air.

As used herein, "water" means water that, in compositional nature, is useful for operation of a fuel cell power system. While certain particulates are acceptable in generally available water, they might cause plugging in addition to plugging caused by particulates in the oxidant gas. Therefore, as should be apparent, the water used must be appropriately cleaned before being introduced into the fuel cell power system.

The hydrogen of reformate stream 120 and the oxygen of oxidant stream 124 react in fuel cell stack system 122 to produce electricity. Anode exhaust (or effluent) 126 from the anode side of fuel cell stack system 122 contains some unreacted hydrogen. Cathode exhaust (or effluent) 128 from the cathode side of fuel cell stack system 122 may contain some unreacted oxygen. These unreacted gases represent additional energy for recovery in combustor 130, in the form of thermal energy, for various heat requirements within power system 100, such as heating of vaporizer 178 to vaporize water and also for heating and vaporizing fuel 114. A hydrocarbon fuel 132 and/or anode effluent 126 are combusted, catalytically or thermally, in combustor 130 with oxygen provided to combustor 130 either from air in stream 134 or from cathode effluent stream 128, depending on power system 100 operating conditions. In one embodiment, fuel 132 and fuel 114 are provided from the same fuel source. Combustor 130 discharges exhaust stream 154 to the environment, and the heat generated thereby is used in vaporizer 178 and fuel processor 112 as needed.

In one embodiment, energy store 186 buffers electricity 184 from fuel cell 122 to a consuming system of the generated electrical power. Energy store 186 may include a battery in one embodiment or, in an alternative embodiment, an ultra-capacitor.

Control module 164 controls control valves 172, 174, and 176, and also energy input regulator 180 in response to one or more control signals including a temperature signal from temperature indicator 170, a current demand signal from an accelerator pedal 188 operated by a human driver in a vehicle embodiment, and a current signal from current sensor 182 (or electrical power sensor 182) associated with the fuel cell 122. In one embodiment, energy input regulator 180 is essentially a control valve controlling fuel 132 to combustor (heater) 130. In an alternative embodiment, energy input regulator 180 is a local controller having affiliated control elements and sensors for specifically controlling combustor 130. In this latter embodiment, control module 164 inputs a set point signal for the level of energy that should be output from combustor 130 for input to vaporizer 178. Process control 166 (also denoted as "software" and/or "executable logic" and/or an "executable program" as a data schema holding data and/or formulae information and/or program execution instructions) is provided in control module 164 for controlling operation of power system 100. In one embodiment, computer 164 and process control 166 are provided as an ASIC (application-specific integrated circuit).

Figure 2:
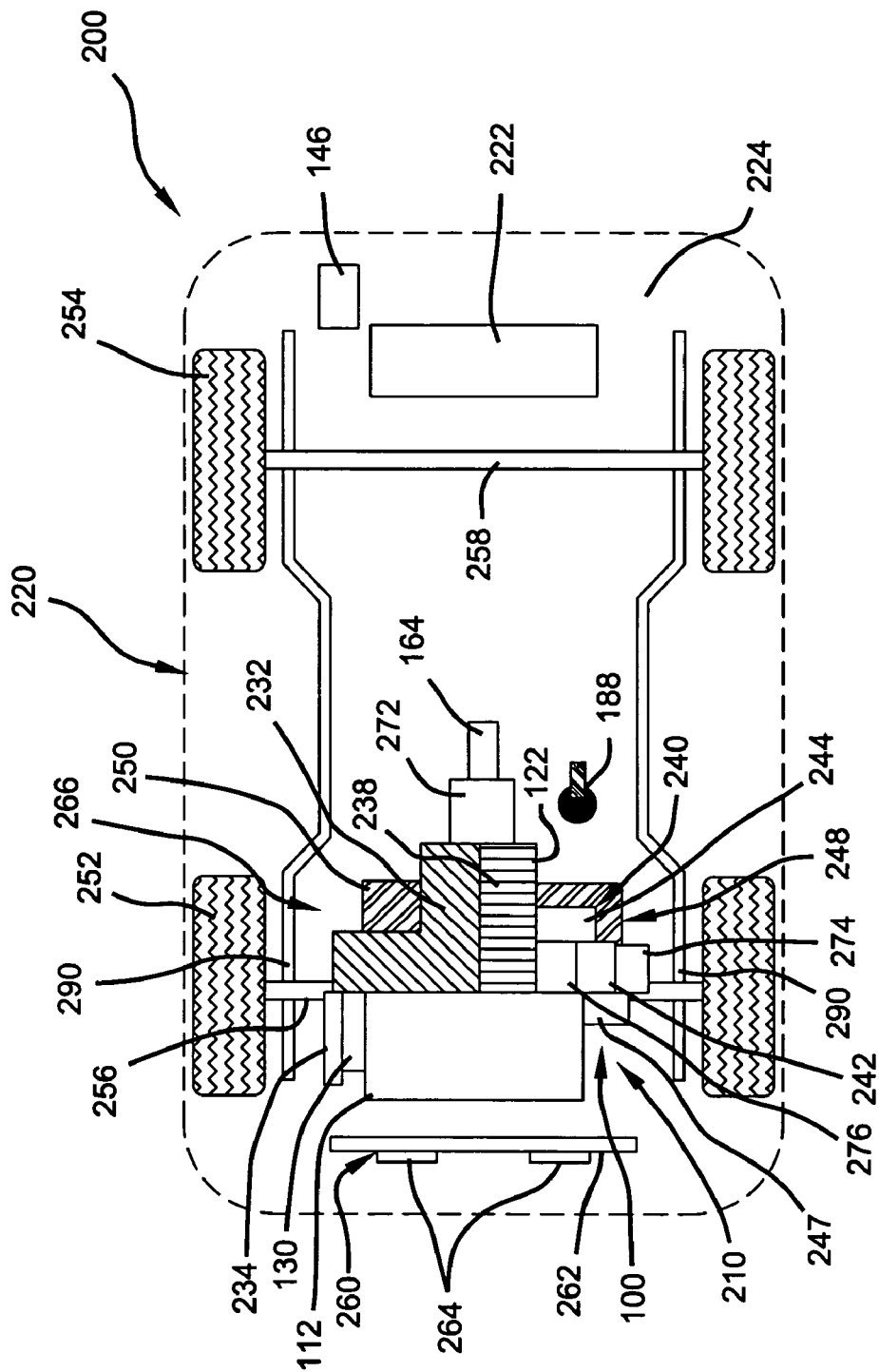
FIG. 2 presents a top view of a vehicle schematically illustrating components of the power system of FIG. 1 in a vehicular environment.
Figure 3:
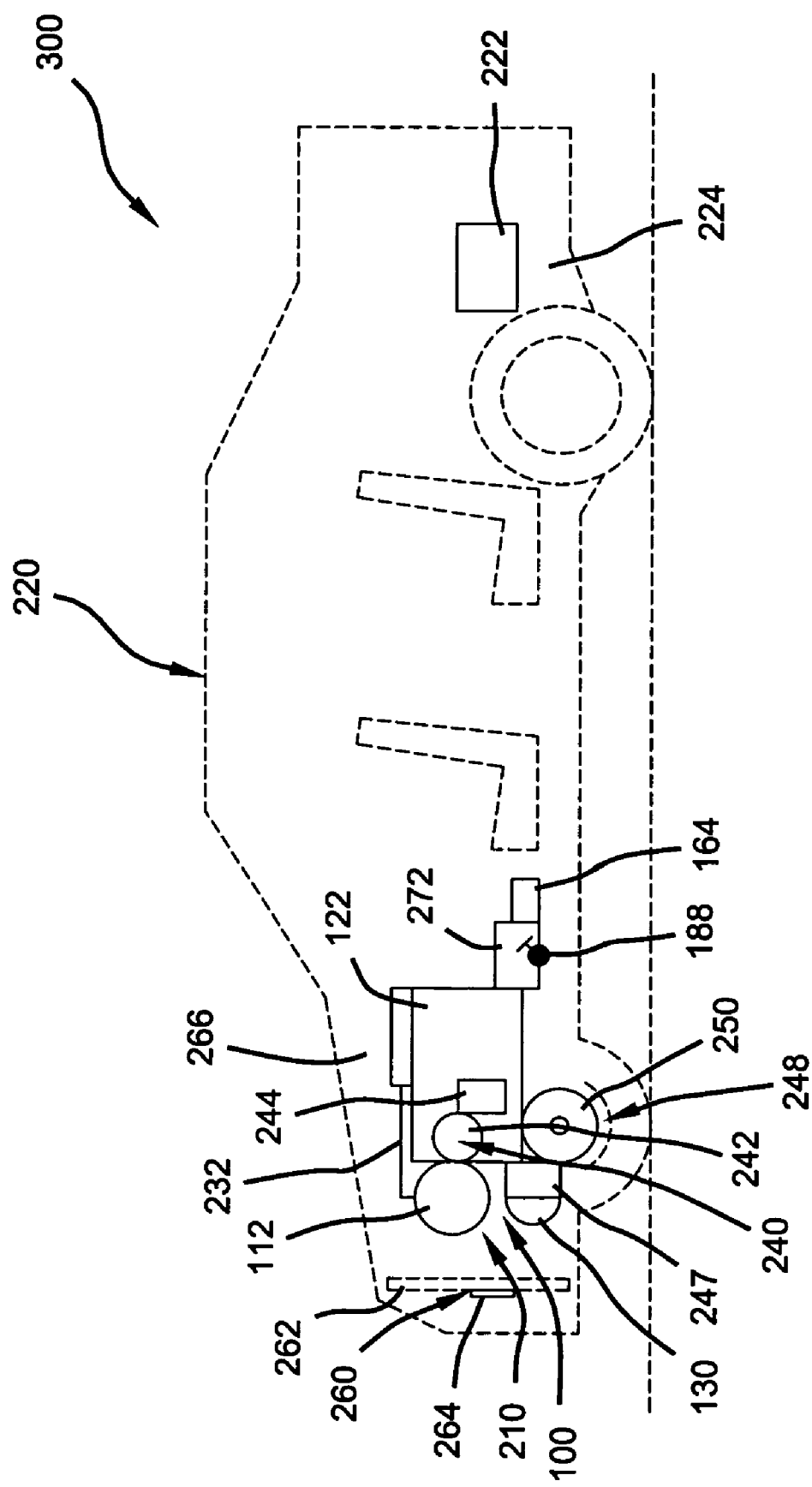
FIG. 3 shows a side view of the vehicle illustrated in FIG. 2.

Fuel cell power system 100 may be stationary or may be an auxiliary power system in a vehicle. In a preferred embodiment, however, fuel cell power system 100 powers a vehicle such as a passenger car, truck, or van. FIG. 2 and FIG. 3 present a vehicle 220 to illustrate components of such a vehicular system 100 in electrochemical propulsion system 210 in vehicle 220. Electrochemical propulsion system 210 is positioned in front compartment 266 of vehicle 220 and supported on frame rails 290. Drive system 248 transmits mechanical power from electric drive motor 250 to provide traction power for vehicle 220.

Fuel cell 122 generates electricity from individual bipolar fuel cell plates 238 to at least one electric drive motor 250 operatively connected to front vehicle wheels 252 via front axle 256. In an alternative embodiment, motor 250 drives rear vehicle wheels 254 via rear axle 258. Voltage converter 272 adjusts voltage in generated electricity for use in auxiliary vehicle components. Fuel 114 (such as, without limitation, gasoline, methanol, or diesel fuel) is stored in fuel tank 222 in rear underbody compartment 224.

Thermal management system 260 includes heat exchanger 262 and adjacent cooling fan 264 positioned to dispute heat generated in this propulsion system 210 with cool incoming air at the forward end of front compartment 266. Hydrogen-containing product of (optional) carbon monoxide reduction reactor 232 (such as water-gas shift (WGS) and/or preferential oxidizer (PrOx) reactors) used to reduce the level of carbon monoxide in reformate stream 120 to acceptable levels as previously referenced is delivered to (optional) cooler 234 and thence to fuel cell 122. In an embodiment where cooler 234 is not needed, fuel cell 122 is downstream of reactor 232.

Air generator 240 includes closely coupled air compressor 242 and optional cathode humidifier 244 to humidify fuel cell 112 oxidant. If used, humidifier 244 receives deionized water from water reservoir 146. Air cooler 247 may be included as part of air generator 240. Inlet air is provided through filter 274 as mounted to the inlet of compressor 242. Exhaust 154 from combustor 130 is delivered to expander 276, which powers compressor 242.

Figure 4:
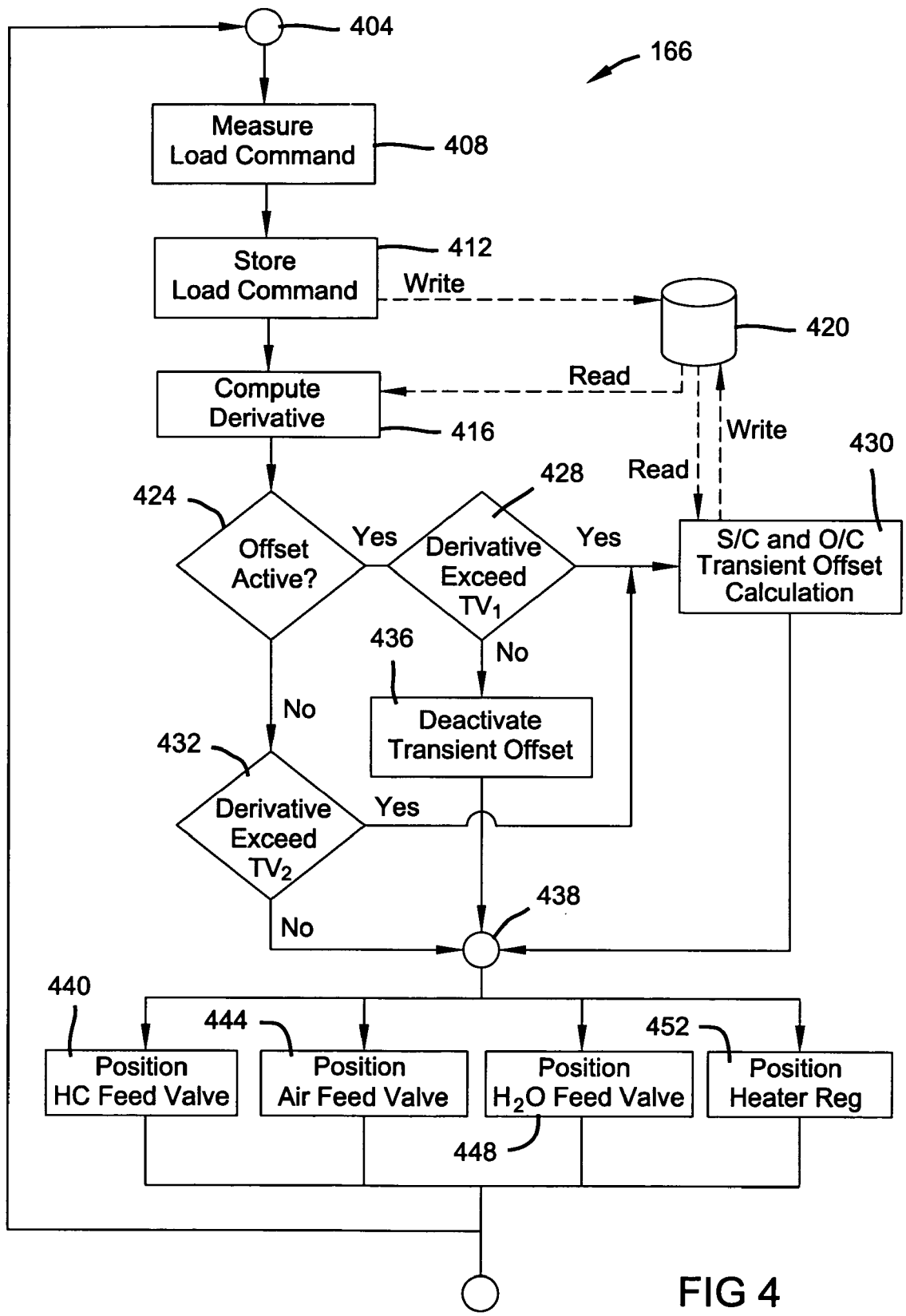
FIG. 4 presents a flow chart of the control for adjusting throughput of control elements of a fuel cell power system according to a predefined throughput ramp when the rate of change in load command deviates from zero by more than a threshold value.

Turning now to further detail in process control 166, FIG. 4 presents an overview for adjusting throughput of valves 172, 174, 176 and regulator 180 according to a predefined throughput ramp when the time derivative of the current demand deviates from zero by more than a threshold value to initiate a transient control mode. Once in this mode, step change adjustments are made in flows of fuel and water as well as the steam to carbon (S/C) and oxygen to carbon (O/C) ratios for the primary reactor (ATR) of the reformer 112 to adjust these flows in a predefined manner to account for this transient demand. In this regard, the throughput of one or more of valves 172, 174, 176 and regulator 180 may be promptly modified according to a predefined throughput ramp to provide more feed promptly to the reactor and so that the anode stoichiometry requirement is also promptly modified according to the predefined throughput ramp when the transient control mode is initiated.

As should be appreciated, the present invention contemplates initiation of the transient control mode when the rate of change in the current demand in either a positive direction (acceleration) or a negative direction (deceleration). Thus, a negative rate of change similarly adjusts throughput of control valves 172, 174, 176 and regulator 180 according to a second predefined throughput ramp when the rate of change of the current demand deviates from zero by more than a second threshold value.

Process control 166 proceeds from Start 404 to Measure Load Command 408, which measures the position of accelerator pedal 188. This measurement is stored in database 420 in the Store Load Command 412 operation. In the next operation, Compute Derivative 416, a determination of the rate of change or time derivative of the recent measurements taken in step 408 is computed by using recent data from database 420 to yield a rate of change in the current demand (i.e., the current demand derivative or CDD). In this regard, the current demand derivative may be negative or positive in value. As previously noted, the current demand derivative may be computed as a time derivative of the position of accelerator pedal 188, or it may be an estimated derivative or other rate of change indicator based on change of the current demand over a period of time. In one embodiment, a differential operational amplifier generates a signal representing the current demand derivative, Operation 408 measures input from the operational amplifier and the program immediately proceeds to Operation 424. In another embodiment, a determination of the current demand derivative is taken from current (power measurement) sensor 182 as it measures electrical power delivered from fuel cell 122.

After determination of the current demand derivative to fuel cell 122, process control 166 proceeds to Decision 424 to ascertain if an offset step to adjust throughput of control valves 172, 174, 176 and regulator 180 is already active. If the transient control offset is active (i.e., YES), then process control 166 proceeds to determine if the current demand derivate exceeds a threshold value $TV_1$ at decision block 428. Based on the outcome of decision block 428, process control 166 will proceed to a stoichiometry (S/C and O/C) transient offset calculation at block 430 when the threshold value is exceeded or to deactivate the transient control offset at block 436 when the threshold value $TV_1$ is not exceeded 428.

If the transient control offset is not active (i.e., NO), process control 166 proceeds to Decision 432 to determine if the current demand derivative exceeds a threshold value $TV_2$. Based on the outcome of decision block 432, process control 166 will proceed to the stoichiometry (S/C and O/C) transient offset calculation at block 430 when the threshold value is exceeded or to deactivate the transient control offset at block 436 when the threshold value $TV_1$ is not exceeded.

After accounting for the transient control offset, process control 166 operates to adjust the control valves 172, 174, 176 and regulator 180 in accordance with the computed control signals at blocks 440, 444, 448, 452 respectively.

One skilled in the art will recognize that the threshold values $TV_1$ or $TV_2$ for the current demand derivative may differ depending on the sign of the current demand derivative (i.e. a positive or negative derivative indicating an increasing or decreasing rate of change). In an alternative embodiment, a comparison of the absolute value of the current demand derivative my be used for a single threshold value.

Figure 5:
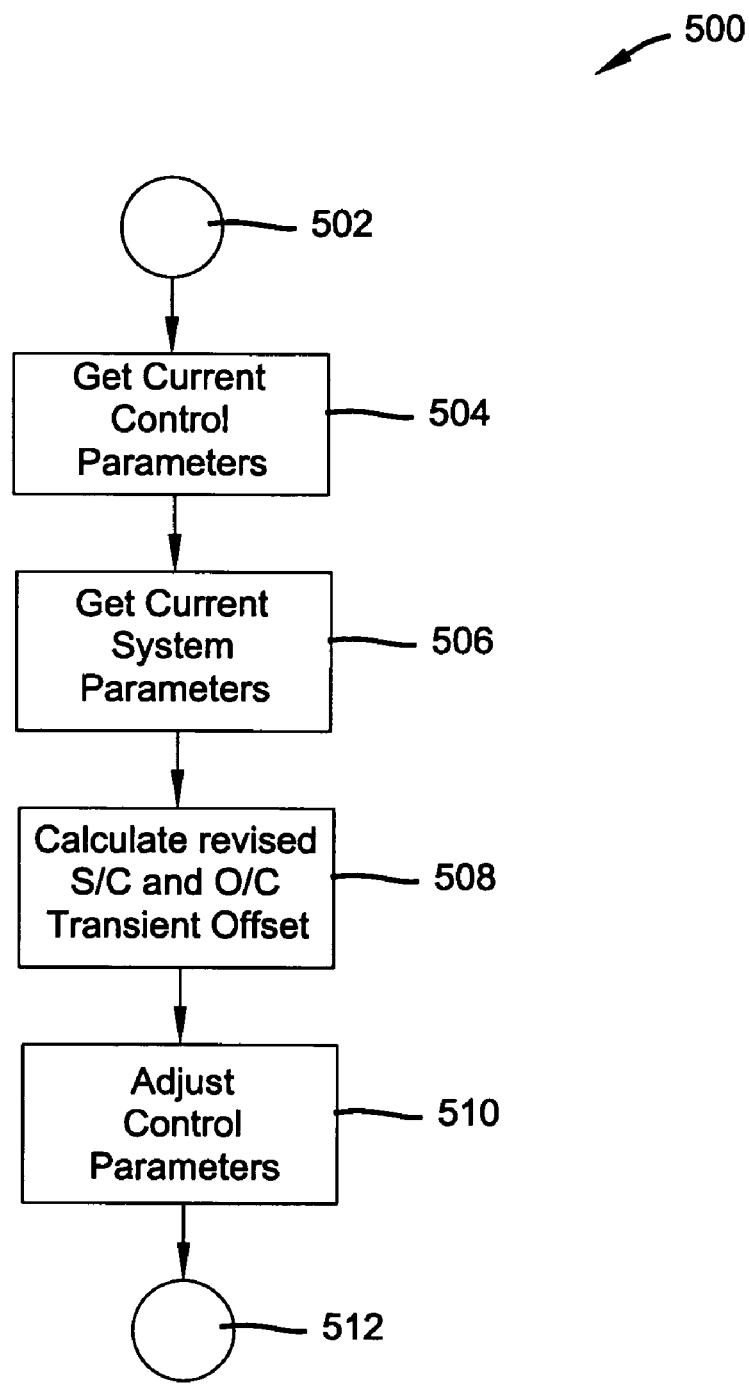
FIG. 5 presents detail in a portion of the flow chart of FIG. 4.

The stoichiometry (S/C and O/C) transient offset calculation at block 430 is further detailed in flow chart 500 of FIG. 5. Entry to Start 502 is from either Decision 428 or Decision 432. Process control 166 proceeds from Start 502 to Block 504 where the control parameters of the current demand derivative are retrieved. These control parameters represent the state (activated, deactivated), direction (positive, negative) and the magnitude of the S/C and O/C transient offset.

Next, process control 166 retrieves the system parameters at block 506 to evaluate the need to modify the control parameters including the state, direction or magnitude of the offset. In this regard, various system parameters are compared to predetermined threshold values to determine if subsequent action should be taken. System parameters which represent the operating condition of system could include the power demand, the power output, the operating temperature of various components in the system, the hydrocarbon content of the effluent, amount others. These system parameters may be used independently or in any combination to arrive at suitable assessment of the operating condition of the system.

Based on this data, a revised S/C and O/C transient offset is calculated at block 508 which are used to adjust the control parameters at block 510. These modified control parameters include state, direction and magnitude of the transient offset which are subsequently used to compute control signals for the system feed valves 172, 174, 176 and regulator 180.

In modifying the control parameters, set points for valves 172, 174, 176 and regulator 180 may be adjusted by the process control 166 to effectively implement feed forward control in set point values. In this regard, set points for valves 172, 174, 176 and regulator 180 are modified according to respective predefined throughput steps with the step rates set to be sufficient for providing acceptable output voltage, carbon monoxide level in the effluent feed stream to the fuel cell, hydrocarbon concentration in the effluent feed stream to the fuel cell, and the like during the transient demand event. When the offset state is inactive (i.e., OFF), the fuel cell power system 100 is controlled according to a conventional feedback methodology appropriate for steady state operation. Process control 166 then returns from block 512 to control point 438 in FIG. 4 at which set point adjustments are made to position the HC feed valve 172, air feed valve 174, $H_2O$ valve 176 and regulator 180 in accordance with the process control 166.

Figure 6:
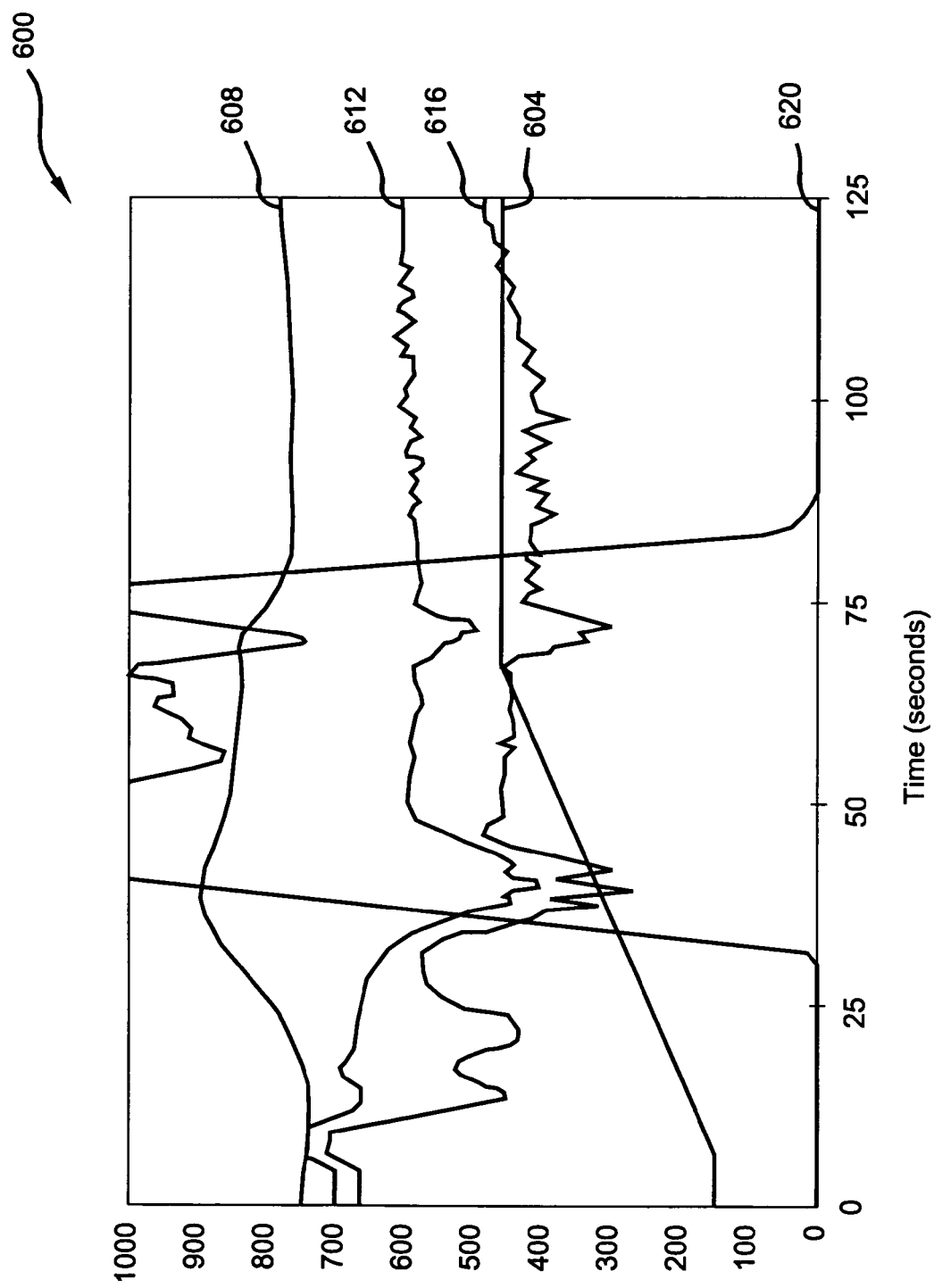
FIG. 6 presents empirical data for a fuel cell power system under traditional feedback control during a load command transient.
Figure 7:
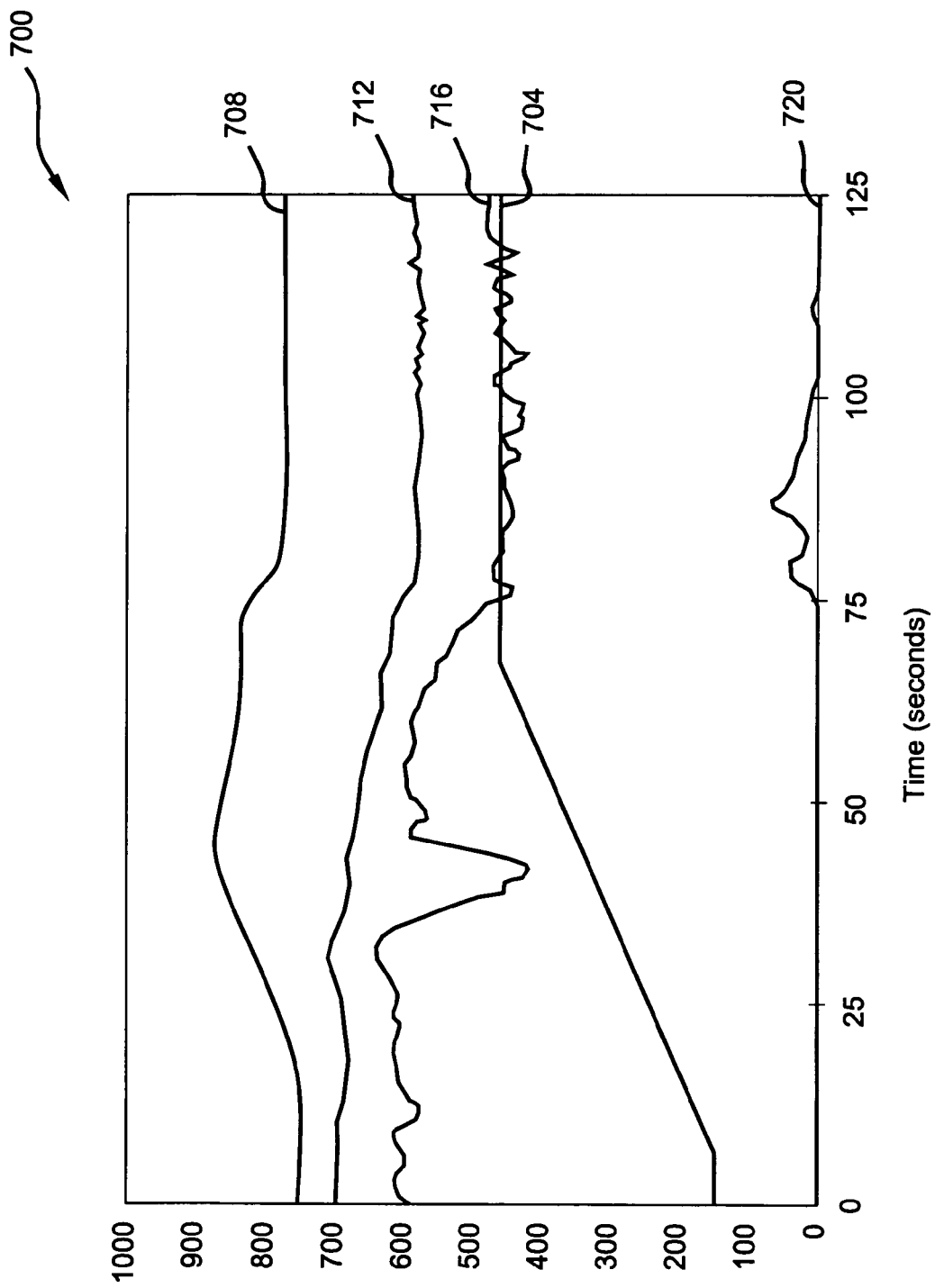
FIG. 7 presents empirical data for a fuel cell power system under a feed forward control in accordance with the present invention during the load command transient used for the data shown in FIG. 6.

Benefits from the feed forward control approach initiated upon identification of a load transient are further appreciated from comparative consideration of FIG. 6 and FIG. 7. FIG. 6 presents plotted data 600 for a fuel cell power system 100 under traditional feedback control during a relatively slow up-transient respective to a moderate rate of change in the current demand on the fuel cell stack 122. In this regard, plotted data 600 shows evidence of the three problems (stack voltage decline, carbon monoxide "spiking", and temperature "spiking") described previously.

Data 600 includes a time plot of current demand 604 (in amperage, on a scale of 0 to 1000 amps), reactor (ATR) temperature 608 (in degrees C., on a scale of 0 to 1000 degrees C.), average cell voltage 612 (in millivolts, on a scale of 0 to 1000 millivolts), minimum cell voltage 616 (the lowest voltage of any fuel cell in fuel cell stack 122 in millivolts, on a scale of 0 to 1000 millivolts), and stack carbon monoxide 620 (in parts per million, on a scale of 0 to 1000 ppm). Note the dramatic drop in average cell voltage 612 and minimum cell voltage 616. Note also the large increase in carbon monoxide (to greater than 1000 ppm) entering the fuel cell stack. There is also a significant rise in ATR temperature 608, approaching 900 degrees C.

FIG. 7 presents plotted data 700 for the same fuel cell power system as for FIG. 6 under feed forward control as described herein during essentially similar rate of change in the current demand as in FIG. 6. In this regard, plotted data 700 shows evidence of resolution of the three problems (stack voltage decline, carbon monoxide "spiking", and temperature "spiking") described previously respective to the fuel cell power system transient of FIG. 6.

Plotted data 700 includes a time plot of current demand 704, reactor (ATR) temperature 708, average cell voltage 712, minimum cell voltage 716, and stack carbon monoxide 720 (all comparably scaled to the scale of data 600 in FIG. 6). Note the greatly reduced carbon monoxide concentration 720 entering the stack compared to carbon monoxide concentration 620 of data 600, and the improved average cell voltage (voltage 712 as compared to voltage 612, especially at about 40 seconds) and minimum cell voltages (voltage 716 as compared to voltage 616, especially at about 40 seconds where the decline in 616 spikes downward to below 300 mV from above 600 mV and the decline in 716 has a more limited down spike to the 400 mV from about 600 mV). Additionally, the peak ATR temperature 708 is just over 800 degrees C. as compared to the peak ATR temperature 608 of 900 degrees C. in data 600 of FIG. 6.

In a comparative summary between the feed forward approach of the preferred embodiments (during a transient) against a feedback approach, the feed forward approach provides for reduced levels of carbon monoxide to the fuel cell stack and accompanying higher cell voltage and stack efficiency. A potential further exists for reduced CO loading of precious metal catalyst with the fuel cell since carbon monoxide excursions are minimized. Reduced temperature excursions in the auto-thermal reactor provides efficacy respective to catalyst and reactor vessel durability. Significantly improved transient load response has also been demonstrated. System up-transient response also improved from approximately 160 seconds to 45 seconds after implementing the control changes according to the preferred embodiments.

Sizing of fuel cell power system 100 components and definition of predetermined ramp rates for handling up-transient response of reformer output during an increase in the current demand are iteratively interdependent. This interrelationship between component capacity and dynamic responsiveness is inherent in any engine design. In this regard, predetermined ramp rates are defined in existing embodiments to enable desired output conditions to be achieved. In new systems, desired responsiveness according to a predefined ramp rate for the current demand derivation is a criterion for design so that the fuel cell power system is engineered to provide the desired response.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel processor for catalytically reacting at least one reformer fuel feed stream into a hydrogen-containing supply stream for a fuel cell, comprising:
   a load command sensor for a fuel cell;
   a feed stream control valve for regulating flow of a feed stream to a reformer;
   a control module connected to said feed stream control valve and to said load command sensor, said control module initiating a transient control mode for adjusting throughput of said feed stream control valve according to a predefined throughput ramp when a current demand derivative deviates from zero by more than a threshold value.

2. The fuel processor of claim 1 wherein said feed stream is a hydrocarbon fuel stream.

3. The fuel processor of claim 1, further comprising a temperature sensor connected to said control module, said temperature sensor positioned in said reformer to measure temperature thereof;
   wherein said control module adjusts throughput of said feed stream control valve according to said predefined throughput ramp to maintain said temperature within a predetermined temperature range.

4. The fuel processor of claim 1 wherein said feed stream is a water stream.

5. The fuel processor of claim 1 wherein a first feed stream is a water stream, a second feed stream is a hydrocarbon fuel stream, and said fuel processor further comprises:
   a heater for vaporizing said water stream to water vapor wherein said control module controls energy input to said heater at a predefined rate when said current demand derivative deviates from zero by more than said threshold value.

6. The fuel processor of claim 5, further comprising a temperature sensor connected to said control module, said temperature sensor positioned in said reformer to measure temperature thereof;
   wherein said control module adjusts throughput of said feed stream control valve according to said predefined throughput ramp to maintain said temperature within a predetermined temperature range.

7. In a vehicle of the type powered by electricity generated from a reformer receiving a fuel supply stream from a fuel processor which catalytically reacts a hydrocarbon feed stream and a water feed stream to generate a reformate stream, the improvement comprising:
   a load command sensor for said vehicle;
   a hydrocarbon control valve for regulating flow of said hydrocarbon feed stream;
   a water control valve for regulating flow of said water; and
   a control module connected to said hydrocarbon control valve, to said water control valve, and to said load command sensor, said control module initiating a transient control mode for adjusting throughput of said hydrocarbon control valve according to a first predefined throughput ramp for said hydrocarbon feed stream when a current demand derivative deviates from zero by more than threshold value and adjusting throughput of said water control valve according to a second predefined throughput ramp for said water feed stream when said acceleration deviates from zero by more than said current demand derivative threshold value.

8. The vehicle of claim 7, further comprising a heater for vaporizing said water stream to water vapor wherein said control module controls energy input to said heater at a predefined rate when said current demand derivative deviates from zero by more than said threshold value.

9. The vehicle of claim 7, further comprising a temperature sensor connected to said control module, said temperature sensor positioned in said reformer to measure temperature therein;
   wherein said control module adjusts throughput of said hydrocarbon control valve and of said water control valve according to said first and second predefined throughput ramps to maintain said temperature within a predetermined temperature range.

10. The vehicle of claim 9, further comprising a temperature sensor connected to said control module, said temperature sensor positioned in said reformer to measure temperature therein;
    wherein said control module adjusts throughput of said hydrocarbon control valve and of said water control valve according to said first and second predefined throughput ramps to maintain said temperature within a predetermined temperature range.

11. The vehicle of claim 7, further comprising an energy store connected to said fuel cell, said energy store receiving said electrical energy from said reformer, and said energy store connected to a motor providing traction power for said vehicle.

12. The vehicle of claim 11 further comprising said load command sensor comprises an electrical current sensor measuring electrical current provided from said energy store to said motor.

13. The vehicle of claim 11 wherein said energy store comprises a battery.

14. The vehicle of claim 11 wherein said energy store comprises an ultra-capacitor.

15. The vehicle of claim 7 wherein said load command sensor comprises an accelerator pedal measuring input from a human operator of said vehicle.

16. A method for operating a hydrocarbon reformer to generate a hydrogen-containing reformate stream catalytically reacting at least one feed stream in said hydrocarbon reformer to generate a reformate stream for a fuel cell, comprising:
    adjusting throughput of said feed stream according to a predefined throughput ramp when a current demand derivative in a load command measurement deviates from zero by more than a threshold value.

17. The method of claim 16 wherein said at least one feed stream includes a water feed stream and a hydrocarbon fuel feed stream, said method further comprising vaporizing said water stream to water vapor at a predefined rate when said acceleration deviates from zero by more than said threshold value.

18. The method of claim 16, further comprising:
    measuring an operating temperature within said reformer;
    adjusting said throughput to maintain said temperature within a predetermined temperature range.

19. The method of claim 16 further comprising:
    determining a first direction of said current demand derivative;
    adjusting throughput of said feed stream is maintained according to said predetermined throughput ramp until said current demand derivative deviates from said threshold value in a second direction opposite said first direction by more than a second threshold value.

20. The method of claim 16 further comprising adjusting throughput of said feed stream is maintained according to said predetermined throughput ramp until said current demand derivative is less than said threshold value.

21. A method for operating a vehicle of the type powered by electricity generated from a fuel cell receiving a reformate stream from a fuel processor which catalytically reacts a hydrocarbon feed stream and a water feed stream into said reformate stream, comprising:
   adjusting throughput of said hydrocarbon feed stream according to a first predefined throughput ramp when a rate of change in a load command measurement for said fuel cell deviates from zero by more than a threshold value; and
   adjusting throughput of said water feed stream according to a second predefined throughput ramp when said acceleration deviates from zero by more than said threshold value.

22. The method of claim 21, further comprising vaporizing said water stream to water vapor at a predefined rate when said acceleration deviates from zero by more than said threshold value.

23. The method of claim 21 further comprising:
   determining a first direction of said current demand derivative;
   adjusting throughput of said feed stream is maintained according to said predetermined throughput ramp until said current demand derivative deviates from said threshold value in a second direction opposite said first direction by more than a second threshold value.

24. The method of claim 21 further comprising adjusting throughput of said feed stream is maintained according to said predetermined throughput ramp until said current demand derivative is less than said threshold value.

* * * * *